(12) United States Patent
Chen et al.

(10) Patent No.: US 11,595,416 B2
(45) Date of Patent: Feb. 28, 2023

(54) METHOD, PRODUCT, AND SYSTEM FOR MAINTAINING AN ENSEMBLE OF HIERARCHICAL MACHINE LEARNING MODELS FOR DETECTION OF SECURITY RISKS AND BREACHES IN A NETWORK

(71) Applicant: Vectra AI, Inc., San Jose, CA (US)

(72) Inventors: Hsin Chen, San jose, CA (US); Nicolas Beauchesne, Miami Beach, FL (US); Himanshu Mhatre, Mountain View, CA (US); John Steven Mancini, San Jose, CA (US)

(73) Assignee: Vectra AI, Inc., San Jose, CA (US)

( * ) Notice: Subject to any disclaimer, the term of this patent is extended or adjusted under 35 U.S.C. 154(b) by 316 days.

(21) Appl. No.: 16/861,121

(22) Filed: Apr. 28, 2020

(65) Prior Publication Data

US 2020/0374308 A1 Nov. 26, 2020

Related U.S. Application Data

(60) Provisional application No. 62/851,529, filed on May 22, 2019.

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01)

(58) Field of Classification Search
CPC .... G06K 9/6218; G06N 20/00; H04L 63/104; H04L 63/1416; H04L 63/1425; H04L 67/22; H04L 63/20
See application file for complete search history.

(56) References Cited

U.S. PATENT DOCUMENTS

| 9,600,656 | B1 | 3/2017 | Wellinghoff |
| 10,803,169 | B1 * | 10/2020 | Flatten ................. G06F 21/554 |
| 2008/0288330 | A1 | 11/2008 | Hildebrand et al. |
| 2015/0012751 | A1 | 1/2015 | Forster et al. |

(Continued)

FOREIGN PATENT DOCUMENTS

EP 3223495 A1 9/2017

OTHER PUBLICATIONS

European Search Report dated Aug. 7, 2020 for EP Appln. No. 20176070.9.

*Primary Examiner* — Olugbenga O Idowu
(74) *Attorney, Agent, or Firm* — Vista IP Law Group, LLP

(57) ABSTRACT

Disclosed is an improved approach for identifying security risks and breaches in a network by applying machine learning methods that learn resource access patterns in the network. Specifically, by observing the access pattern of the network entities (e.g. accounts, services, and hosts) from authorization requests/responses, the model through unsupervised learning, organizes the entity relationships into an ensemble of hierarchical models. The ensemble of hierarchical models can then be leveraged to create a series of metrics that can be used to identify various types of abnormalities in the access of a resource on the network. For instance, by further classifying the access request for a resource using abnormality scores into detection scenarios, the model is able to detect both an abnormality and the type of abnormality and include such information in a corresponding alarm when a security breach happens.

26 Claims, 11 Drawing Sheets

(56) References Cited

U.S. PATENT DOCUMENTS

2018/0219888 A1 8/2018 Apostolopoulos
2019/0081959 A1 3/2019 Yadav et al.
2019/0349391 A1* 11/2019 Elsner ................ H04L 63/1416

* cited by examiner

Abnormality Detection Type Matrix 700

| Account-Host | Account-Service | Host-Service | Abnormality Classification |
|---|---|---|---|
| 1 | 2 | 1 | Breach |
| 1 | 2 | 2 | Breach |
| 2 | 1 | 2 | Breach |
| 2 | 2 | 1 | Breach |
| 2 | 2 | 2 | Breach |
| 1 | 0 | 2 | Breach |
| 2 | 0 | 1 | Unusual Admin Console |
| 2 | 1 | 2 | Unusual Admin Console |
| 1 | 1 | 2 | Unusual Admin Console |
| 2 | 2 | 1 | Unusual Admin Console |
| 1 | 2 | 0 | Compromised Secure Console/Jump System |
| 2 | 1 | 0 | Compromised Secure Console/Jump System |
| 2 | 2 | 0 | Compromised Secure Console/Jump System |
| 0 | 2 | 1 | Rogue Admin |
| 0 | 1 | 2 | Insider Attack |
| 0 | 2 | 2 | Insider Attack |
| 2 | 0 | 0 | Admin Second Console |
| 0 | 0 | 2 | Admin Second Console |

Row 7

Fig. 7

METHOD, PRODUCT, AND SYSTEM FOR MAINTAINING AN ENSEMBLE OF HIERARCHICAL MACHINE LEARNING MODELS FOR DETECTION OF SECURITY RISKS AND BREACHES IN A NETWORK

BACKGROUND

Understanding the network environment and the interaction between entities is crucial to guarding the security of the network. There are several reasons that cause this task to be very difficult. For instance, as the volume of network traffic has exploded so has the amount of data corresponding to activities associated with security risks and breaches. Unfortunately, this has made it difficult for current system to be able to cope with the processing burden.

For example, there are enormous numbers of entities (accounts/hosts/services) in many networks. Thus, tracking every one of them in a timely fashion can be computationally intense if not impossible. Additionally, due to the massive amount of data these entities generate as a whole, it is nearly impossible to focus on an individual event or series of events—e.g. there is so much noise that finding the relevant data is essentially impossible.

Moreover, in an active network environment, novel connections are made all the time. However, merely identifying novel connections as such adds little to no value to processes for maintaining security over/of a network, as much of this traffic may correspond to ordinary and non-risky behavior but this traffic also obscures the risky if not malicious activity. Nonetheless, identification of security risks and breaches based on network traffic remains a critical goal of any network security process.

Thus, what is needed is a way to efficiently and informatively perform detection of security risks and breaches in a network.

SUMMARY

In some embodiments, the approach provides a way to identify security breaches in a network by applying machine learning methods that learn resource access patterns in the network. Specifically, by observing the access pattern of the network entities (e.g. accounts, services, and hosts) from authorization requests/responses, the model through unsupervised learning, organizes the entity relationships into an ensemble of hierarchical models. The ensemble of hierarchical models can then be leveraged to create a series of metrics that can be used to identify various types of abnormalities in the access of a resource on the network. For instance, by further classifying the access request for a resource using abnormality scores into detection scenarios, the model is able to detect both an abnormality and the type of abnormality and include such information in a corresponding alarm when a security breach happens.

Further details of aspects, objects, and advantages of some embodiments are described below in the detailed description, drawings, and claims. Both the foregoing general description and the following detailed description are exemplary and explanatory and are not intended to be limiting as to the scope of the embodiments.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. These drawings depict only typical embodiments of the invention and are not therefore to be considered limiting of its scope, the invention will be described and explained with additional specificity and detail using the accompanying drawings.

FIG. 7 illustrates a matrix for use in classifying new access data as part of generation of detection results illustrated in FIG. 2 according to some embodiments of the invention.

DETAILED DESCRIPTION

Figure 1:
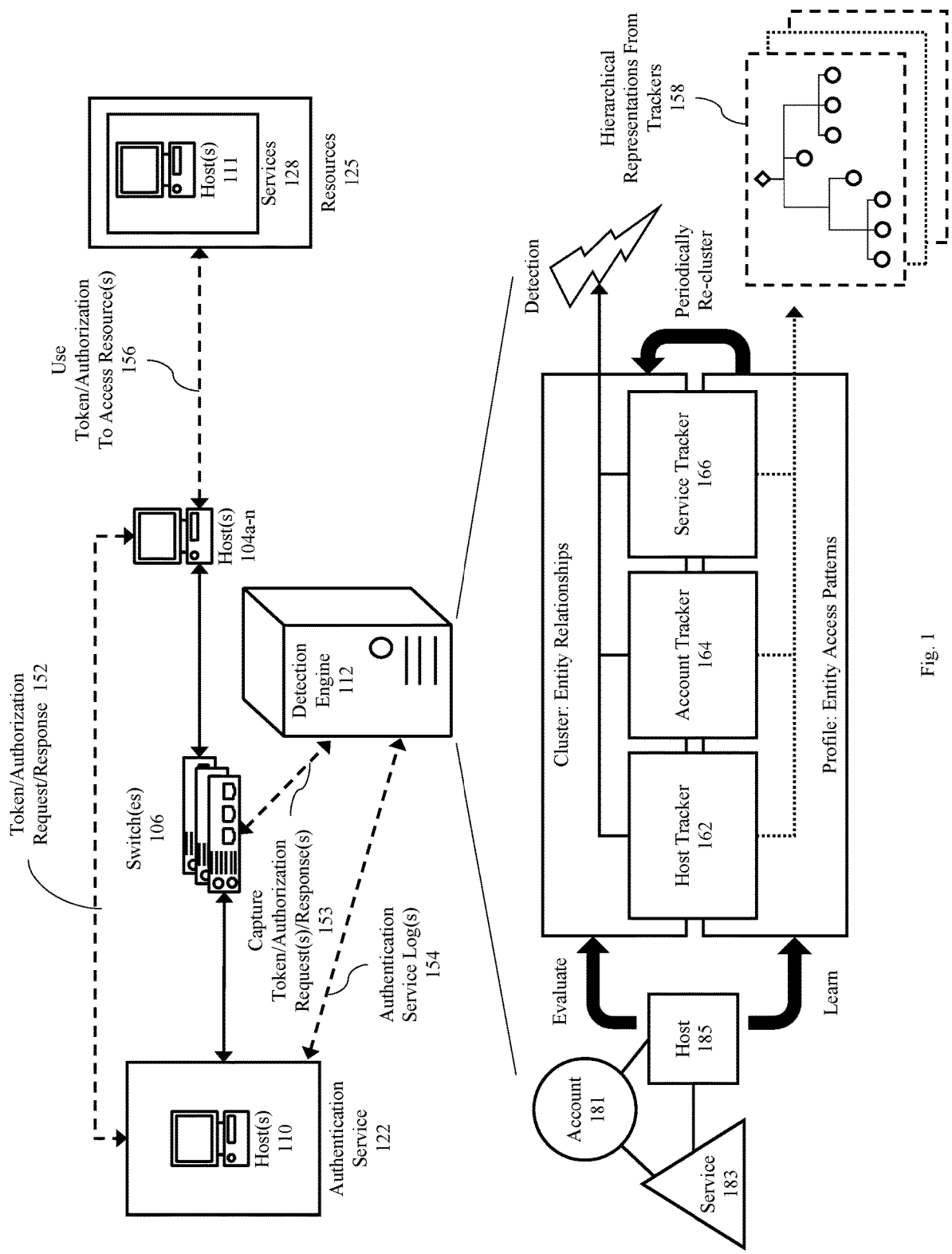
FIG. 1 illustrates an example environment(s) in which some embodiments of the invention are implemented.

Various embodiments of the invention are directed to a method, product, and system for maintaining an ensemble of machine learning based hierarchical models and detection of security risks and breaches in a network using the hierarchical models generated by the machine learning process.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items.

Understanding the structure of the network is fundamental to spotting abnormal behavior. Entities of the same type (accounts, services, or hosts) that reside in the same functional group often have similar behavioral characteristics and share permissions to access resources or to be accessed by an account/host in a networking environment. For instance, an access of a resource by an entity can be considered normal when one or more conditions/rules are met indicating that the relationship should be considered normal or when that resource was accessed a threshold number of times by that entity. For example, a particular access might be considered normal when a minimum of three occurrences are found in a given time window. However, a first entity may also access a resource that was previously accessed by another entity in the same group as the first entity. Depending on the similarity between the members such an access may be considered to either be normal or to have some degree of abnormality. However, access to a resource previously accessed by another member of that group is usually less concerning than access to a resource not previously accessed by any members of the group. Thus, capturing group memberships of entities assists in determining how normal or abnormal a corresponding access is especially when the access crosses a group boundary—e.g. an access that corresponds to a resource usually accessed by members of another group, different from the group of the accessing entity, might be considered either normal or abnormal depending on how different/similar the groups. To address this, in some embodiments, a learned hierarchical relationship between the groups is used. Specifically, in some embodiments, the approach uses a model(s) (e.g. trees) generated by performing hierarchical clustering to achieve learning of the network structure, where groups that are behaviorally similar are closer in the hierarchy than less similar groups. This hierarchical relationship is then leveraged to identify abnormalities without generating noise which allows for insightful detections.

In some embodiments, network token/authorization traffic is examined to learn the token/authorization behavior associated with accounts, hosts, and services of a network by a detection engine. The detection engine generates one or more hierarchical models that associates entities of the same type (e.g. the accounts, hosts, or services) and a corresponding relationship(s). These models can then be used to determine whether a particular behavior is normal or abnormal, and if the behavior is abnormal whether that abnormality is sufficient to trigger an alert. Additionally, accounts might be associated with a system service (e.g. a system backup account), a user (e.g. a single assigned user), multiple users (e.g. assigned or shared without express authorization), a host (e.g. an account used on the device to authenticate from), and/or multiple hosts (e.g. multiple devices an account is used from).

In some embodiments, a detection engine, or a part thereof, is at or connected to one or more switches or hosts operating an authentication service for capturing network token/authorization traffic. The detection engine can capture the network traffic by processing the traffic in line or by performing a zero-load copy operation(s). Furthermore, in some embodiments, the detection engine processes authentication service logs. In some embodiment, the authentication service logs and the network token/authorization traffic are stitched together prior to processing. In some embodiments, service logs can be processed in place of and to the exclusion of network traffic by the detection engine.

In some embodiments, the hierarchical structures are generated using a training dataset, where the training data set corresponds to past network token/authorization traffic during an identified time window, a sliding time window, or over one or more historic periods.

FIG. 1 illustrates an example environment(s) in which some embodiments of the invention are implemented. The figure illustrates relationships between hosts, an authentication service, a detection engine, and a resource. Additionally, the figure provides an illustrative representation of the learning and evaluation from/of access requests.

For instance, the detection engine 112 may implement a two-phase process comprising a learning phase and an evaluation phase.

The learning phase of the detection engine 112 may include profiling entity access patterns and clustering entities based on, at least, entity relationships represented by the profiles. In some embodiments, profiles comprise an aggregation of the entity relationships identified from access request data corresponding to a plurality of access requests. As will be discussed further below, the detection engine operates on feature data extracted from token/authorization request/response data (see 152). In some embodiments, the feature data comprises at least an account (see 181), a service (see 183), and a host (see 185) associated with a particular access request of a plurality of access requests. Some of these features can be thought of as entities having a relationship to another entity (e.g. an account used on a host to access a service). For instance, for a given access request, an account might have a relationship to a service requested and to a host from which the account requested access. These relationships, either separately or together might be represented by a hierarchical structure (e.g. tree) generated and maintained by the user tracker 164. Similarly, for that same access request, the service 183 will also have a relationship to the account 181 and the host 185 that is separately or together represented by a hierarchical structure (e.g. tree) generated and maintained by the service tracker 166. Likewise, for that same access request, the host 185 will have a relationship to the account 181 and the service 183 that is separately or together represented by a hierarchical structure (e.g. tree) generated and maintained by the host tracker 162. Specifically, by collecting and converting access data corresponding to a plurality of access requests into feature data extracted therefrom, a profile can be generated that represents entity access patterns over one or more time periods. Using these profiles, different hierarchical representations (e.g. hierarchical representations from trackers 158) can be generated from the perspective of the corresponding entity (e.g. account, service, or host) by the corresponding tracker (see e.g. host tracker 162, account tracker 164, and service tracker 166). Specifically, clustering of the entities can be performed to identify closely associated entities (primary groups) and various metrics associated with the entities of the groups and between groups such as a distance between entities and a confidence in an entity's membership in a particular group.

In the evaluation phase, newly received access request data is converted into feature data which is compared to the hierarchical representations to make a determination therefrom as to a level of normalcy/abnormality of the associated access request. For instance, each of an associated account, service, and host has two corresponding metrics, each of which corresponds to a level of normalcy/abnormality. For instance, the attributes for an account might comprise hosts the account was seen on and the services the account received authorization to access. Likewise, attributes for a host might comprise accounts that were seen on the host and services that accounts on the host received authorization to access. Finally, attributes for the service might comprise accounts that received authorization to access the service and hosts from where accounts received authorization to access the service. Thus, in some embodiments, evaluation is associated with six attributes that correspond to six metrics which represent the abnormality, if any, for each of the relationships. Furthermore, in some embodiments, a detection of an abnormality (possibly above a corresponding threshold) may trigger a detection and subsequent corresponding alert specifying a detection type.

In some embodiments, feature data can be used to update entity access patterns and/or to trigger re-clustering, such as on a periodic basis, possibly conditioned on the receipt of new data. Additionally, the profiling and clustering may be performed for discrete time periods, sliding windows, all time, or any other variation thereof. Regardless, the detection engine and processes thereof will be discussed further below.

Generally, services correspond to resources in a network. For instance, resources 125 comprise any number of resources accessed by hosts on a network. Furthermore, resources may comprise both services and traditional resources. For instance, services include email services, Structure Query Language (SQL) based services, etc. hosted by one or more host(s) 111. Traditional resources comprise accessible file systems such as network-based file shares that are accessible on a file by file basis via protocols such as Common Internet File System (CIFS) or Server Message Block (SMB).

Access to the resources 125 is managed by an authentication service 122. In some embodiments, the authentication service 122 is implemented by one or more host(s) 110. The authentication service 122 maintains or has access to a dataset to determine which requests from which accounts should be provided a positive response (e.g. a token or authorization) to allow access to a requested resource. In some embodiments, the authentication service comprises a Microsoft "Active Directory" service or is accessible via the Kerberos authentication/authorization protocol, though one of ordinary skill in the art would understand that other similar services could be implemented.

To briefly illustrate, the Kerberos authentication protocol generally works as follows. The Kerberos architecture usually contains the following systems: a client account operating from a client host, a service hosted on a service host, and a Kerberos Domain Controller (KDC) (see e.g. authentication service 122), which holds keys it shares with each client and service. The first step is for an account to authenticate itself with a realm (which can be thought of as a namespace) managed by the KDC. Once authenticated, using the secret shared by the client account and the KDC, the KDC provides the client account with a session key and a ticket granting ticket (TGT). This session key can be used for a predefined length of time as a "passport" inside the network. The TGT is encrypted with the KDC master key and is later used by the KDC for service authorization. This encryption scheme allows for stateless distributed deployments of KDC infrastructure. When the client account needs to access a service/application/host, it sends the session key, the TGT, and an access request to the KDC for the service. The KDC can decrypt the TGT using its master key, thereby ensuring that the TGT is authentic. Having completed the authentication phase, the KDC can then perform the authorization phase, which determines whether the client is allowed to access a particular service. Once the request passes this check, the KDC can construct and send a ticket granting service (TGS) reply to the client that is encrypted with both the client account session key and the service session key. Once the client receives the TGS, it can start to communicate directly with the service/host. The client sends the part of the TGS that was encrypted by the KDC with session key to the service/host. Once the service/host has used its own session key with KDC to verify the validity of the TGS, it knows that KDC has approved the client account to access the service it provides, and then gives access to the service to client account.

Communications between the authentication service and the host(s) 104*a-n* are exchanged over one or more switches 106. Generally, these communications are initiated by the host(s) 104*a-n*. A client host transmits a token/authorization request 151 on behalf of an account to the authentication service over one or more switches 106. The authentication service 122 will process the token/authorization request 151 to determine whether a token or authorization should be provided to the host. Depending on the result of that determination, the authentication service 122 will return a denial or a token/authorization granting the requested access at 152. If the token is provided to the host, (e.g. a host of host(s) 104*a-n*) the host will use the token/authorization to access the internal network resource 125 at 156.

In some embodiments, the detection engine 112 includes a sensing module(s) for capturing token/authorization requests and/or responses at 153 from one or more of switches 106 or authentication service 122. For instance, the detection engine 112, includes multiple distributed sensing modules (taps) located at different locations (e.g. switch(es) 106 and/or authentication service 122 host(s) 110). The sensing modules can identify relevant information for use by the remainder of the detection engine 112—e.g. host corresponding to the request, requested service, the associated account, a corresponding protocol, whether the communication is a request or a response, whether the request was granted or denied, the time of the request/response, or any other relevant information. In some embodiments, the sensing module(s) are not part of the detection engine but are otherwise used to capture relevant information that is then provided for use by the detection engine 112.

In some embodiments, only requests or responses are captured at 153. In some embodiments, both requests and responses are captured. Furthermore, in some embodiments, the detection engine 112 processes authentication service logs, (see 154). Usually, most token/authorization requests will occur directly over the internal network and thus be capturable directly from network packets at one or more network devices (e.g. switches 106, or from host(s) 110 of authentication service 122). However, some requests will occur over encrypted connections (e.g. secure shell (SSH) or remote desktop protocol (RDP)) and can't be captured merely by observing packets at network devices. Instead, these encrypted connection authorization requests and responses are logged by the authentication service 122. Thus, the encrypted connection authorization requests and responses can be retrieved by parsing the authentication service log(s) at 154. In some embodiments, authentication service logs are aggregated at a log collector (not illustrated) prior to being provided to the detection engine 112. In some embodiments, the authentication service log(s) are compared to previously captured network activity to remove/exclude duplicate communications and thus avoid analyzing/counting the same request and/or response twice. As will be discussed further below, in some embodiments, the logs and captured network activity can be stitched together in order to enrich the information available from only one of these sources.

In some embodiments, the detection engine 112 is provided on one or more host(s) 110 of the authentication service 122, on one or more separate hosts, on the switch(es) 106, or any combination thereof. The operation of the detection engine 112 is discussed further below at least in regard to FIGS. 2-8.

Figure 2:
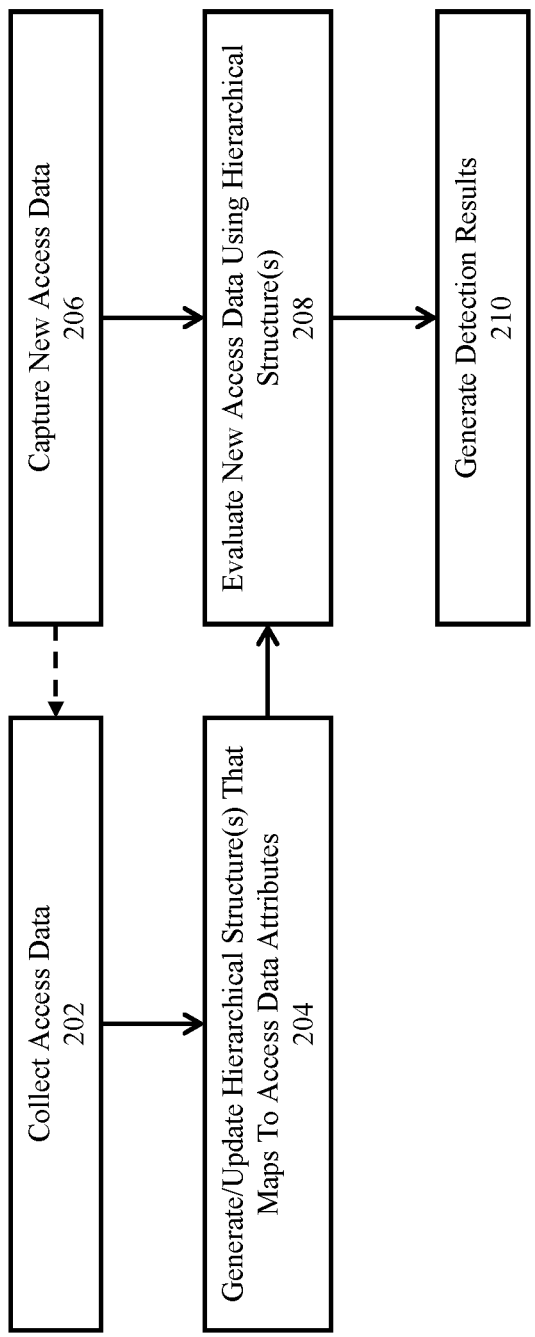
FIG. 2 illustrates a process flow according to some embodiments of the invention.

FIG. 2 illustrates a process flow according to some embodiments of the invention. Specifically, FIG. 2 illustrates a process flow implemented by the detection engine 112 discussed above, and in some embodiments, one or more sensing modules. Generally, the approach implements a machine learning process to learn the relationships between entities on a network and generate clusters thereof and use of the machine learning algorithm to evaluate subsequently received access request/response data. Specifically, the process includes collection of access request/response data, creation and maintenance of hierarchical structures that map one or more entity relationships based on at least access data attributes. After an initial training period, new access data is captured, and evaluated using the hierarchical structures to determine its level of abnormality. If the access data corresponds to an abnormal authorization request/response, the type of abnormality can be classified as part of generating the detection results output.

In some embodiments, the process starts by collecting access data at 202. For instance, access data may be collected using any combination of captured token authorization requests and/or responses (see 153) and authentication service log(s) (see 154) associated with an authentication service (see 122) as discussed in regard to FIG. 1. In some embodiments, the access data is maintained in a database and retrieved or provided to the processes associated with 204. For instance, a token/authorization request/response is captured as access data using one or more sensing modules on switches such as switch(es) 106 discussed above in regard for FIG. 1 or log data is received from a domain controller or an intermediate log collector. The captured data can comprise any combination of request data, response data, or both. Furthermore, the data can be capture from network activity directly (e.g. by a packet copy operation) in real time, from log data (e.g. by parsing received activity logs), or both. When both direct network activity and log data is used to generate a training dataset, the log data is parsed to identify relevant information and also combined with other data in a process called "stitching" (herein) that will be discussed further below. In some embodiments, log data is further processed by comparing the log data to activity extracted from captured traffic to remove redundant entries.

In some embodiments, at 204, one or more hierarchical structures are generated that map access data attributes. Furthermore, in some embodiments, the hierarchical structures may be updated periodically corresponding to a training time period, based on a triggering event, at the request of an administrator, or any combination thereof. For instance, the hierarchical structures might be updated at a frequency of any number of years, months, weeks, days, hours, minutes, or even seconds. Additionally, the hierarchical structures might be updated every time some specified number of new access requests occur corresponding to a number of sets of new access data subsets. In some embodiments, the training time period comprises a sliding time window, a periodic time window, a fixed time window, or a manually adjustable time window. For instance, a training window might comprise 30 time windows each comprising a 12-hour time period that corresponds to a default time period for which a ticket granting ticket is valid.

Furthermore, in some embodiments, previously identified network activity that corresponds to one or more types of abnormal behavior is excluded from the training data to avoid normalizing the activity. The generation and of the hierarchical structures will be discussed further below.

In some embodiments, new access data is captured at 206 after the generation of the hierarchical structures at 204. The new access data is then evaluated using the hierarchical structures to determine whether the new access data corresponds to an abnormal access request at 208. For instance, as previously discussed the access request can be viewed from the perspective of the host used, the service requested, and the account associated with the request. These perspectives may result in six different metrics that can be used to identify abnormality and to determine the type of abnormality.

For instance, if at 208 the evaluation of the new access data using the hierarchical structure(s) identifies an abnormality in one or more of the metrics, a detection results generation process is triggered at 210, where the type of detection can be determined using the identified abnormal attribute(s) using any of a lookup table, a linked list, an ordered list, a tree structure, or any other searchable or indexable data structure.

Furthermore, in some embodiments, the evaluation of new access data can be performed in parallel with the generation of a new/updated hierarchical structure, such as by using a state of one or more hierarchical structures corresponding to a time prior to receipt of the new access data.

In some embodiments, the new access data is maintained in a database for future use in training the machine learning process and generation of the hierarchical structure(s) at 204. Furthermore, the detection engine 112 might receive log data corresponding to token/authorization requests from the authentication service 122 or from a log collector. In some embodiments, only log data for encrypted communications is received. In other embodiments, log data for encrypted and unencrypted requests is received and subsequently processed to identify the requests/responses that were not already captured through another method (e.g. packet copy).

Figure 3:
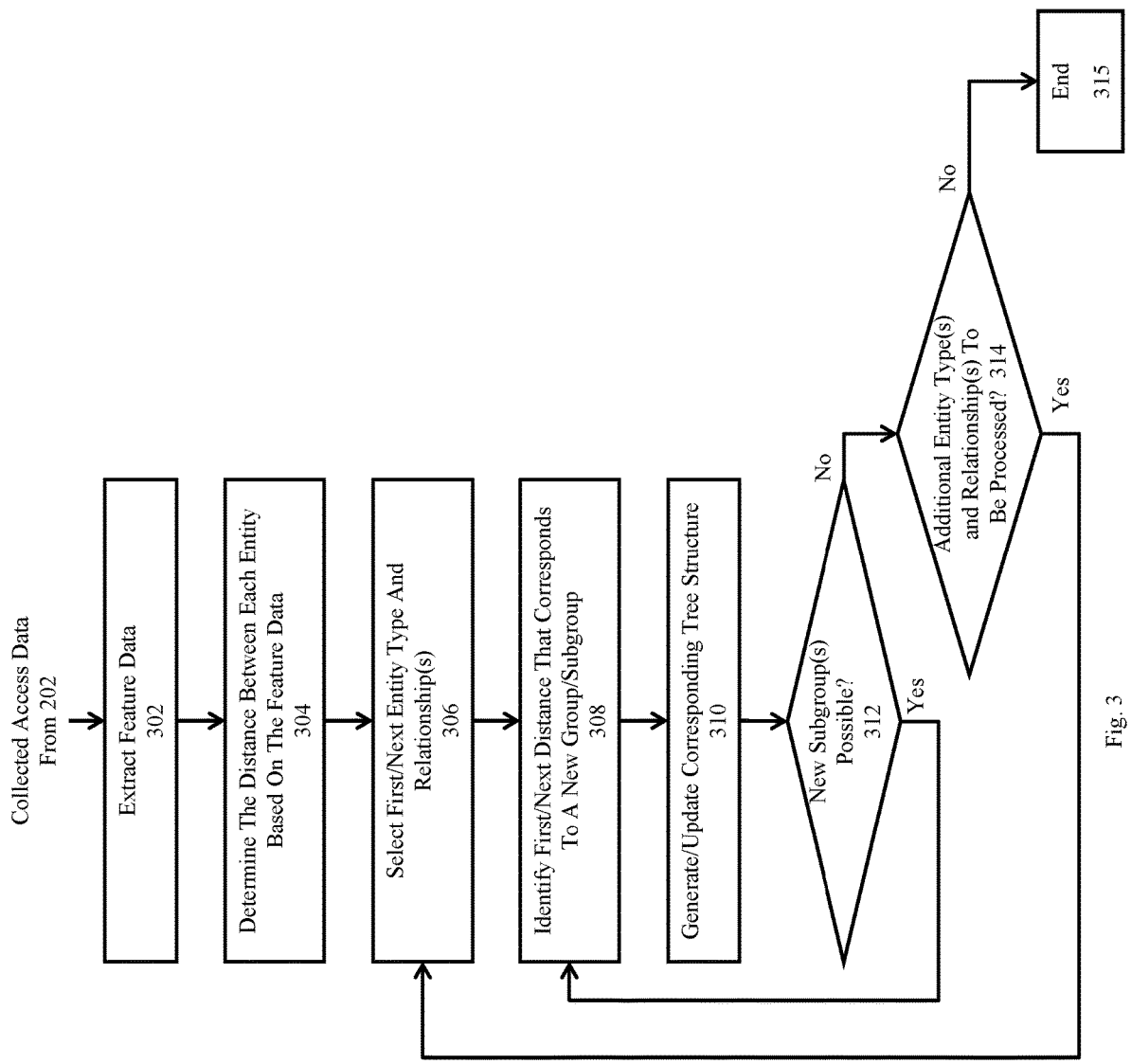
FIG. 3 illustrates an expanded view of the generation/updating of the hierarchical structure(s) shown in FIG. 2 according to some embodiments of the invention.

FIG. 3 illustrates an expanded view of the generation/update of the hierarchical structure(s) shown in FIG. 2 according to some embodiments of the invention. Generally, the process includes, for each entity type, feature extraction, distance calculation based on the features extracted, subgroup identification, and generation/updating of a corresponding tree structure.

In some embodiments, the process starts at 302, where feature data is extracted from the collected access data from 202. For instance, for each account, a list of hosts the account was seen on is generated (a first set of account relationships) and a list of the services the account received authorization to access is generated (a second set of account relationships). Additionally, for each host, a list of accounts seen on the host is generated (a first set of host relationships) and a list of the services the account(s) on the host received authorization to access is generated (a second set of host relationships). Finally, for each service, a list of accounts that received authorization to access the service is generated (a first set of service relationships) and a list of hosts from which the accounts received authorization to access the service is generated (a second set of services relationships). In some embodiments, the lists may be maintained separately, combined for each corresponding account, host, and service respectively, or maintained in a single unified structure. Regardless of how the lists are maintained, each account, host, and service is associated with a profile comprising the first set of relationships, the second set of relationships, or both the first and second set of relationships.

At 304, distances between each entity of the same type are determined based on the feature data, where the type of entity is either an account, a host, or a service. Any method of determining a level of similarity between two entities of the same type can be used here. Furthermore, either or both of the sets of relationships for the entities can be used to generate the distances between entities. For instance, to generate six trees each corresponding to one entity type and one relationship thereof, only the data corresponding to either the first set of relationships or the second set of relationships are used to determine distances between those entities. In the alternative, three tree structures could be generated that combine both the first and the second set of relationships and use both of those relationships to determine the distance between entities of the same type.

For instance, the distance between each entity of the same type can be determined by/as the inverse of a number of features that the entities share, times some normalization/scaling value (whether one or both relationship types are being considered). Thus, for two entities that share some number X of features, the distance between them is (1/X)*SCALING VALUE. The result of the distance calculations can be thought of, and potentially represented as, a set of nodes (corresponding to a set of entities of the same type) and a set of edges (representing the distance between those nodes) which are annotated with the distance values. However, while this captures the overlap between two entities, it does not necessarily work well with entities that have differing numbers of relationships. For example, if node A has 10 features and all 10 of those features overlap with C which also has 10 features, nodes A will appear to be 100% similar to C. However, a node B that has 100 features where only 10 of those features overlap with C will also look to be 100% similar to C. Unfortunately, Node B has 90 other features that are not shared with C and thus C and B are not 100% similar. The above formula fails to capture this nuance.

Another way to determine distances is to use the inverse of the Jaccard index which is also known as intersection over union because it is essentially, the number of attributes share by two sets divided by the number unique attributes in a combination of the sets. Because the Jaccard index is a measure of similarity, the inverse is used and potentially multiplied by a scaling factor to generate distances.

Still further, another way to determine the distance between accounts is to use a custom formulation. For instance, the distance between two accounts can be described as a function of those accounts. (See eq 1 below).

$$d_A(a, b) = \frac{1}{\delta + \left(\sum_{i \in z} w_i \cdot J(X_a^i, X_b^i)\right)^2} \quad \text{(Eq 1)}$$

Where "a" and "b" are two different accounts, "δ" is a small number to avoid dividing by zero, Z={hosts, services} which are the types of relationships of the accounts (e.g. to hosts and to services), "$w_i$" is a weight corresponding to each type of relationship (e.g. to allow for weighting host and service relationships differently), and $J(X_a^i, X_b^i)$ is the Jaccard index of the corresponding relationships for each type of relationship, where "i" is the iterator, $X_a^i$ is an "i"th (e.g. host or service) relationship of account "a" (e.g. the set of hosts of account a), and $X_b^i$ is the "i"th (e.g. host or service) relationship of account "b" (e.g. the set of hosts of account b).

Similarly, the distance between two hosts can be described as a function of those hosts. (See eq 2 below).

$$d_H(a, b) = \frac{1}{\delta + \left(\sum_{i \in z} w_i \cdot J(X_a^i, X_b^i)\right)^2} \quad \text{(Eq 2)}$$

Where "a" and "b" are two different hosts, "δ" is a small number to avoid dividing by zero, Z={accounts, services} which are the types of relationships of the hosts (e.g. to accounts and to services), "$w_i$" is a weight corresponding each type of relationship (e.g. to allow for weighting account and service relationships differently), and $J(X_a^i, X_b^i)$ is the Jaccard index of the corresponding relationships for each type of relationship, "i" is the iterator, $X_a^i$ is an "i"th (e.g. account or service) relationship of host "a" (e.g. the set of accounts found on host "a"), and $X_b^i$ is the "i"th (e.g. account or service) relationship of host "b" (e.g. the set of accounts found on host "b").

Finally, the distance between two services can be described as a function of those services. (See eq 3 below).

$$d_S(a, b) = \frac{1}{\delta + \left(\sum_{i \in z} w_i \cdot J(X_a^i, X_b^i)\right)^2} \quad \text{(Eq 3)}$$

Where "a" and "b" are two different services, "δ" is a small number to avoid dividing by zero, Z={hosts, accounts} which are the types of relationships of the services (e.g. to hosts and to accounts), "$w_i$" is a weight corresponding each type of relationship (e.g. to allow for weighting host and account relationships differently), and $J(X_a^i, X_b^i)$ is the Jaccard index of the corresponding relationships for each type of relationship, "i" is the iterator, $X_a^i$ is an "i"th (e.g. host or account) relationship of service "a" (e.g. a set of hosts from which accounts accessed the service "a"), and $X_b^i$ is the "i"th (e.g. host or account) relationship of service "b" (e.g. the set of hosts from which accounts accessed service "b").

Regardless of how the distance between each entity is determined, at 306 a first/next entity type and relationship(s) is selected. For instance, entities of the account type are selected first. Additionally, the selection of the corresponding relationship is selected to match the distance determination—e.g. if the distance determination used the combined set of relationships then the selection and thus the hierarchy is also based on the combined set, whereas if the distance determination did not combine the set of relationships neither will the hierarchical structure be based on the combined set. Thus, if the sets of relationships were combined together when determining distance, a single tree will be created that maps entities of the same type based on both attributes. If the sets of relationships were not combined then two trees will be created, each based on one of the attributes of the entities of the same type.

The tree generations process starts with essentially all entities for the corresponding tree at the same level (the root). This might be generated at 306, where a first/next distance corresponding to infinity is identified and at 310 an initial tree structure is generated having a leaf for each entity coming off the root and all entities would be part of the same group. Subsequently, at 312, provided there is more than one entity, it would be determined that new a subgroup(s) is possible. Thus, the process will return to 308 where a next distance is determined that will result in the creation of a subgroup.

Figure 5:
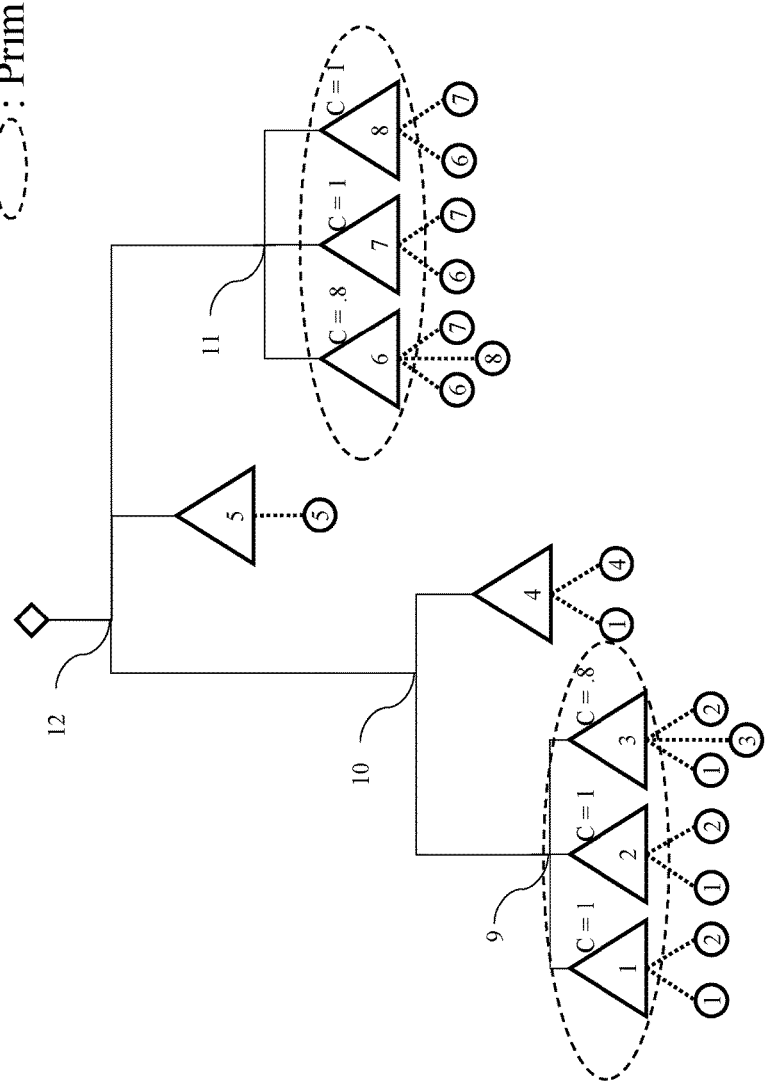
FIG. 5 provides a graphical illustration of a hierarchical structure according to some embodiments of the invention.

There are multiple ways to determine a next distance, which corresponds to determining a branching point where the previous group is divided into two or more subgroups. For instance, a decrementer could be set to a predetermined number that is likely to be greater than the highest possible distance, or to a number greater than the highest distance computed in the previous step. Subsequently, the decrementer could be decremented until the distance between one or more entities is greater than the value represented by the decrementer. Once this occurs the tree structure will be updated at 310 to reflect the branching of the accounts into two or more subgroups. Additionally, this process continues to loop through 308, 310, and 312 until it is determined at 312 the no more subgroups are possible. For instance, because all subgroups contain only 1 account or because all subgroups comprise nodes that have distances that differ by an amount below a threshold. FIG. 5, discussed below, provides an illustration of an example hierarchical structure and branching points.

At 314, a determination is made as to whether there are any additional entity type(s) and relationship(s) to be processed. For instance, if only an account tree was generated that maps both attributes of the accounts, then a host tree still needs to be generated that maps both attributes of the hosts, and a service tree still needs to be generated that maps both attributes of the services. Additionally, if only an account tree was generated that maps a single attribute to accounts (where there are three entity types and two relationships for each), then five more trees remain to be generated—e.g. for the account to second account attribute, host to first host attribute, host to second host attribute, service to first service attribute, and service to second service attribute. Thus, the process at 314 will cause the flow to return to 306 where the next combination of entity type and relationship(s) is selected and subsequently processed at 308, 310, and 312. Once all the entity type and relationship(s) have been processed the flow ends at 315.

In some embodiments, an unsupervised machine learning process can be used to group the entities into subgroups to identify primary groups as an alternative to the steps illustrated in 308, 310, and 312. For instance, a machine learning process might identify groups using the distance between those groups based on one or two relationships. Additionally, one particular technique could include using the HDBSCAN algorithm.

Figure 4:
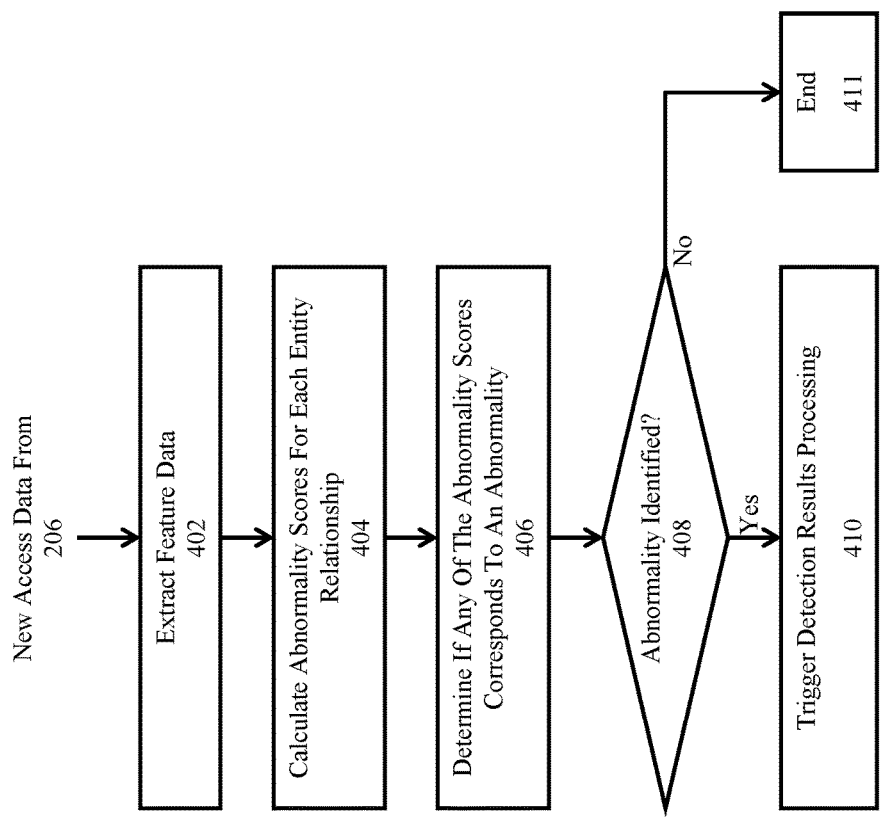
FIG. 4 illustrates an expanded view of the evaluation of new access data shown in FIG. 2 according to some embodiments of the invention.

FIG. 4 illustrates an expanded view of the evaluation of new access data shown in FIG. 2 according to some embodiments of the invention. Generally, the process includes extraction of feature date from access data, calculation of an abnormality score for each entity relationship, and if any of the abnormality scores correspond to a sufficiently large abnormality, triggering a detection results processing step.

In some embodiments, the process starts are 402 where feature data is extracted from new access data (e.g. from 206). This feature data provides the same six relationships as previously discussed when viewed from the perspective of each of the three entity types.

At 404, abnormality scores are calculated for each entity relationship. In some embodiments, when evaluating an entity relationship, a leaf corresponding to the entity is identified. If the entity (represented by the leaf) was already identified as having that relationship (e.g. a service that was previously accessed by an account during the training period), the process assigns an abnormality score of zero for the abnormality score because the tree structure indicates that the relationship is 100% normal. However, if the entity was not previously identified as having that relationship, the abnormality might comprise the distance between the entity and a nearest entity that was previously identified as having that same relationship. For example, if the entity is a service and the relationship is access by an account, then the abnormality score comprises the distance between the service corresponding to the new access data and a nearest service previously accessed by the account as determined using the hierarchical structure that incorporates the historical knowledge for the corresponding period of time. However, if the nearest service is represented by a leaf in the same primary group as the service corresponding to the new access then the abnormality score might be comprised of the distance between the two services times a factor corresponding to a confidence in the determination that the two leaves should be in the same primary group, where the confidence value corresponds to how similar the leafs are to each other (e.g. calculated using the distance function or the Jaccard index or any other method disclosed or known such as the HDBSCAN algorithm). Similarly, the same process can be executed for each of the other five relationships to determine abnormality scores for those relationships to generate the ensemble of abnormality scores.

In some embodiments, the quality of the training can be determined by measuring the differences between hierarchical structures learned at successive points of time. Typically, a well-trained structure will exhibit minimal changes over successive training periods. The quality of the training measured in this manner can be quantified into a "stability" score for the hierarchical structure. For example, a newly trained hierarchical structures can differ from a prior trained hierarchical structure. This difference is manifest when two entities that were part of a common primary group in a prior training are no longer in the same primary group in a subsequent training. In one embodiment, this loss of membership can be treated as an error and an error measurement function such as mean sum of square of errors can be used quantify the difference thereby quantifying the loss of stability. This quantity can then be used to further qualify/disqualify the resulting detection. For instance, the stability can then be used to determine the contribution of the hierarchical structure to the detection process. For example, a stability score can be used as a modifier for the individual thresholds applied to a detection (e.g. a decreased/lower stability can be used as an inverse multiplier to the threshold to increase the required confidence a particular detection must satisfy.

In another embodiment, a singular function can be used to determine abnormality scores for each relationship. For example, evaluation of a particular relationship between an entity "x" and a relationship "a" using an abnormality function (Eq. 5), $$\Lambda(x,a)=(1-N(x,a))\cdot(1-\Gamma(x,a))\cdot\Delta(x,a) \quad (\text{Eq. 5})$$

where $N$, $\Gamma$ and $\Delta$ are the normality, confidence and distance metrics respectively. Thus, if the relationship is already captured by the corresponding tree structure the value of $N(x,a)$ is 1 and as a result the function comprises $zero*(1-\Gamma(x,a))*\Delta(x,a)$. Because zero times anything is always zero, we don't care about the rest of the terms in this scenario. However, if the relationship has not already been captured by the corresponding tree structure the value of $N(x,a)$ is 0 (e.g. the results of $N(x,a)$ is a Boolean true or false) and as a result the function comprises $1*(1-\Gamma(x,a))*\Delta(x,a)$. Thus, an abnormality score can be determined by plugging in the corresponding values for $\Gamma$ and $\Delta$.

In some embodiments, at 406 a determination is made as to whether any of the determined non-zero abnormality scores are sufficiently abnormal to warrant further consideration. For instance, one or more thresholds might be used to determine a minimum abnormality score for further consideration, where abnormality scores that are above or equal to the threshold are represented as one or true (e.g. abnormal) and abnormality scores that are below the threshold are represented as zero or false (e.g. as noise). For instance, abnormality scores that are relatively low, such as those associated with a member of the same primary group, are often not really abnormal, but only comprise normal variation or noise. Thus, thresholds could be set that will exclude from the abnormality determination minor abnormalities.

In some embodiments, a determination is made as to whether an abnormality was identified at 408. For instance, an abnormality identification verification might be used to trigger a detection results processing step at 410 when an abnormality is identified or to end the process at 411 if no abnormality is found.

FIG. 5 provides a graphical illustration of a hierarchical structure according to some embodiments of the invention. Generally, FIG. 5 illustrates a hierarchical structure (tree) from the perspective of entities of the service type against relationships of being accessed by an account (i.e. services access by accounts). Note the similar tree structures can be generated for each of the entity types to relationships such that six tree structures are generated and two are associated with each of the entity types. While not illustrated here, each of the tree structures could also map both relationships for each entity.

As illustrated, each service (numbered 1-8) is represented by a triangle as the leaves of the tree structure. Additionally, each service is associated with one or more account relationships. For instance, services 1 and 2 have a relationship with accounts 1 and 2, service 3 has a relationship with accounts 1-3, service 4 has a relationship with accounts 1 and 4, service 5 has a relationship with account 5, and service 6 has a relationship with accounts 6-8. These relationships can be maintained in any number of ways. For instance, the tree itself could be annotated with the values using a list of values appended to the service identifiers themselves. The service identifiers could be associated with a pointer to its profile. The values could be represented in a table or linked list or any other data structure.

Additionally, each branch in the tree might be identified using an identifier associated with a distance used to create that branch. For instance, the root (represented by the diamond) can be thought of as having a branching value of infinity. However, as illustrated in the tree, a branch occurs at 12, where two subgroups are identified (a first group comprising services 1-4 and services 6-8 and a second subgroup comprising only service 5). Subsequently, at 11 the first grouping is separated into two subgroups (services 1-4 and services 6-8 respectively). At the branch located at 10, the service 4 is removed from the subgroup containing services 1-3. This leaves the final subgroup as services 1-3 (see branch at 9). Note that the branches here correspond to decreasing distance thresholds for inclusion in the subgroup.

Another aspect illustrated by the tree is the primary groups. In some embodiments primary groups are identified as a group of entities that have distances below some threshold or equal to zero. Thus, services 1-3, and services 6-7 are each in different primary groups. However, primary groups may represent literal and complete overlap in features or only a partial overlap. In order to address this, a confidence that an entity (e.g. the service) should be included in the primary group is computed. For instance, Services 1-3 all have a relationship with accounts 1 and 2, but service 3 also has a relationship with account 3. Similarly, services 6-8 all have a relationship with accounts 6 and 7, but service 6 also has a relationship with account 8. Thus, because service 3 and service 6 differ from the rest of the members of the primary group the confidence that they should be included in the particular primary group is lower—e.g. as illustrated services 1, 2, 7, and 8 all have confidence values of 1 (100% confident) whereas services 3 and 6 have a confident values of 0.8 to capture the variation. To correlate this variation to the real world, the primary groups might comprise accounts/services/hosts of/supporting a team/department where the additional account causing the additional service relationship is a manager.

Figure 6A:
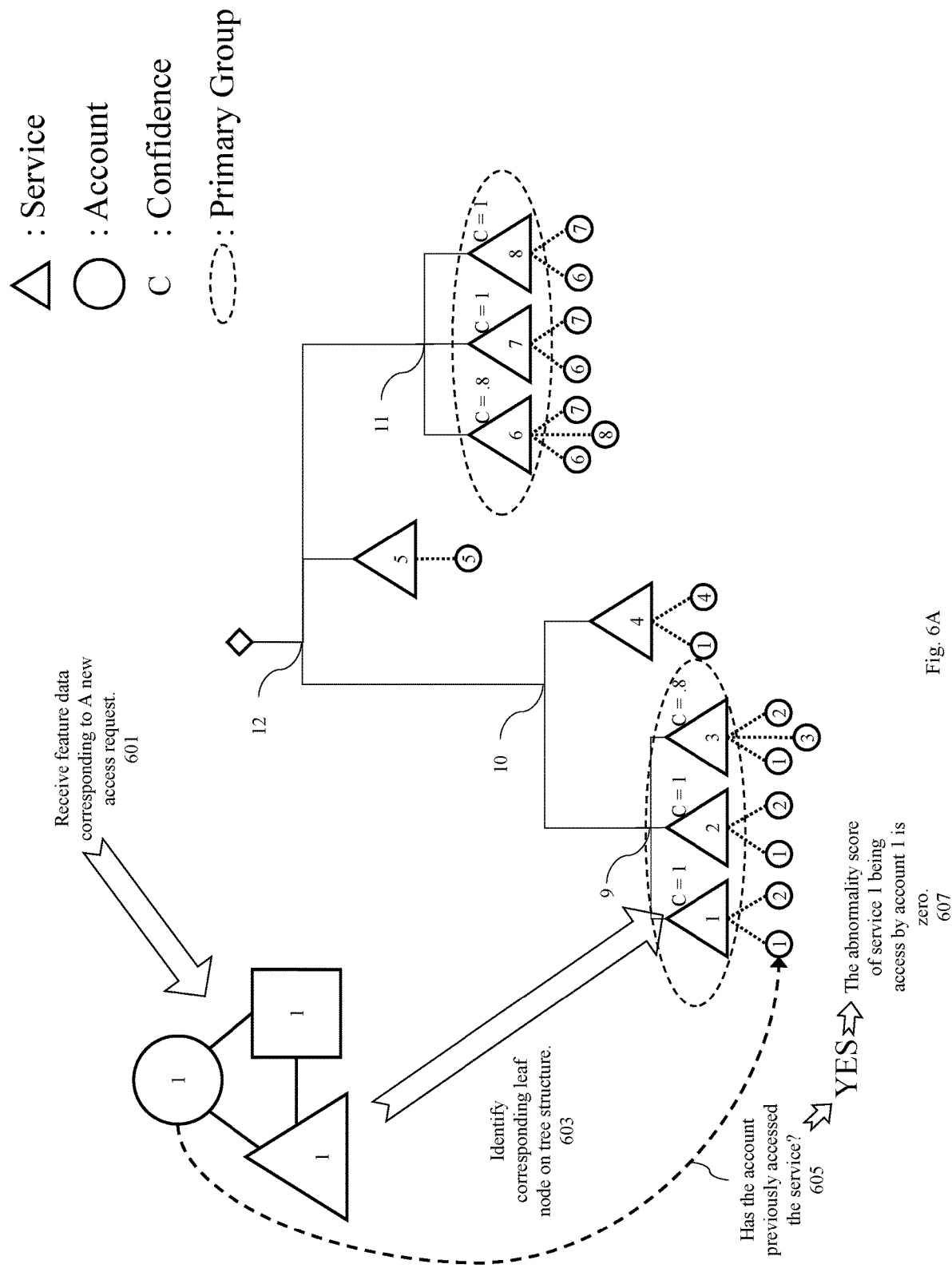
FIG. 6A-C provide graphical illustrations of evaluation of new access data against the hierarchical structure illustrated in FIG. 5 according to some embodiments of the invention.
Figure 6B:
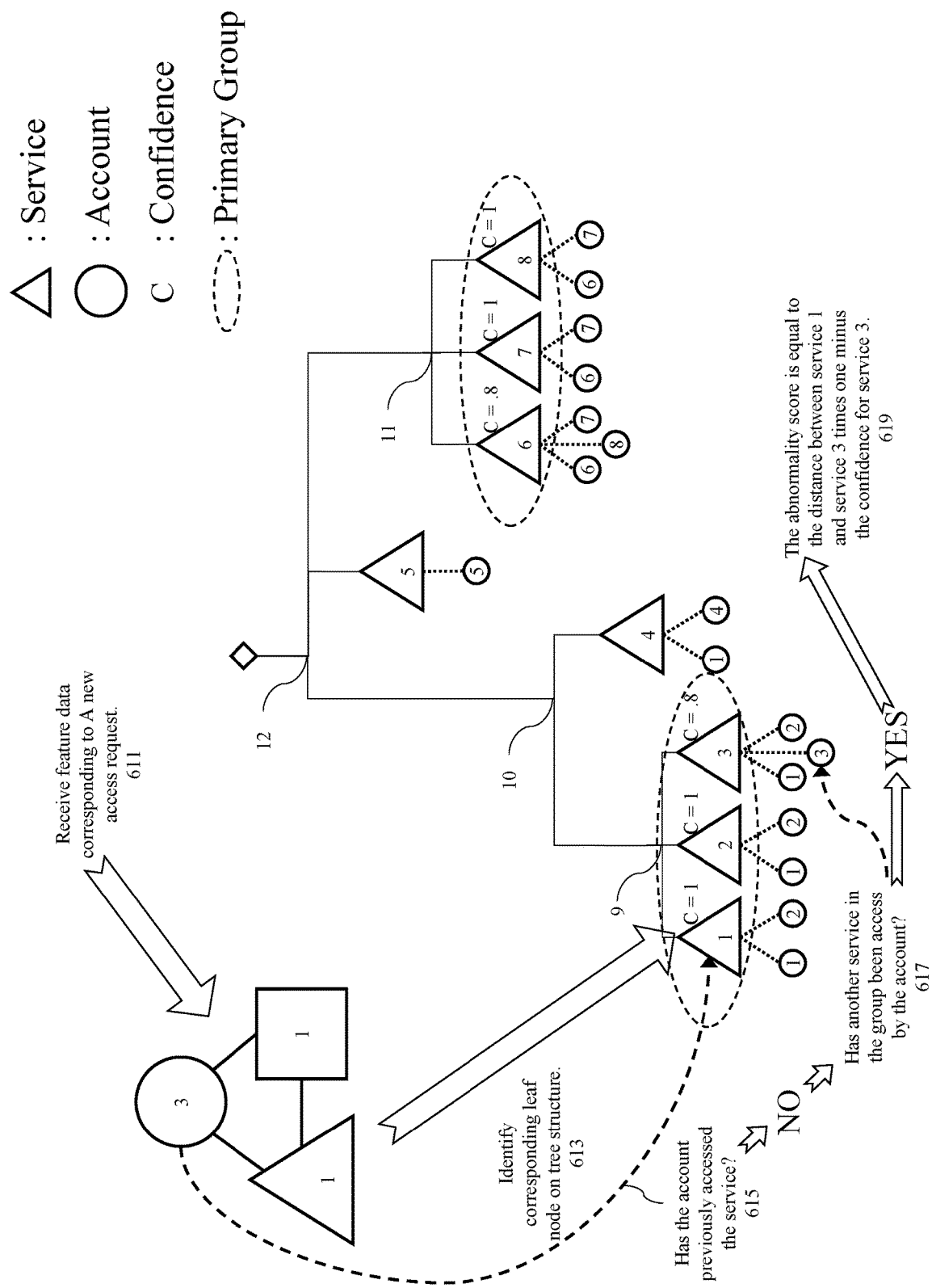
Figure 6C:
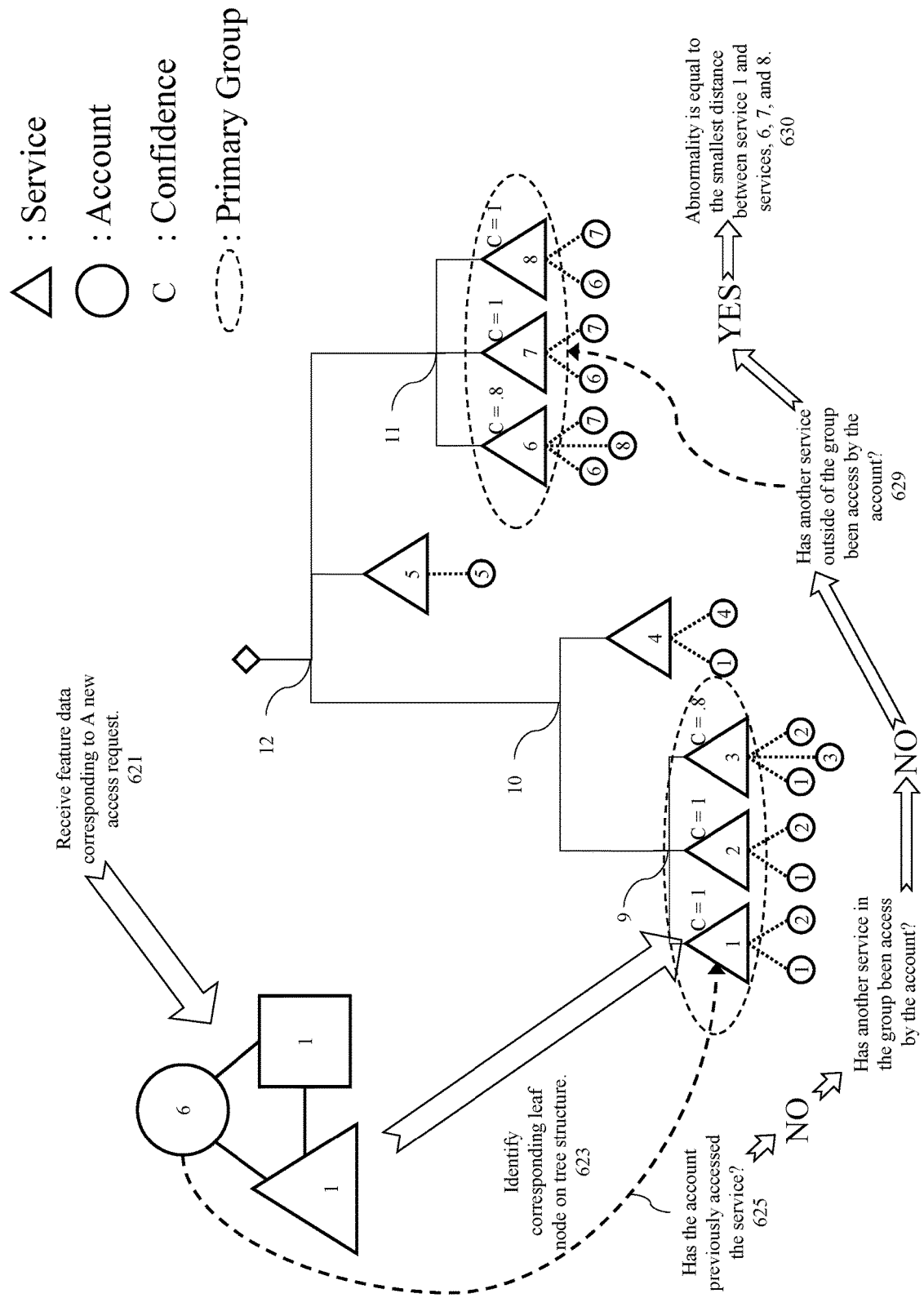

FIGS. 6A-C provide graphical illustrations of evaluation of new access data against the hierarchical structure illustrated in FIG. 5 according to some embodiments of the invention. Specifically, the illustrations represent evaluation from the perspective of a service having a relationship of having been accessed by an account. However, any of the five other entity types and relationship types could be analyzed in the same way.

FIG. 6A illustrates evaluation of access data corresponding to an access that was previously captured.

For example, at 601 feature data corresponding to a new access request is received having an account of 1, a service of 1, and a host of 1. Subsequently, at 603 the leaf corresponding to the service is identified. Once the leaf is identified a determination is made at 605 as to whether the relationship has previously been captured as represented by the tree. Here it has, so at 607 the anomaly score for the entity of service and relationship of being accessed by the account is zero.

FIG. 6B illustrates evaluation of access data corresponding to an access that was not previously captured but can be found within the same primary group.

For example, at 611 feature data corresponding to a new access request is received having an account of 3, a service of 1, and a host of 1. Subsequently, at 613 the leaf corresponding to the service is identified. Once the leaf is identified a determination is made at 615 as to whether the relationship has previously been captured as represented by the tree. Here it has not been previously captured, so at 617 a determination is made as to whether the relationship with account 3 is found within the primary group. Because the relationship is found in the primary group, then at 619 the abnormality score is equal to the distance between service 1 and service 3 times (1−service 3 confidence) (e.g. 1−0.8=0.2).

FIG. 6C illustrates evaluation of access data corresponding to an access that was not previously captured but cannot be found within the same primary group.

For example, at 621 feature data corresponding to a new access request is received having an account of 6, a service of 1, and a host of 1. Subsequently, at 623 the leaf corresponding to the service is identified. Once the leaf is identified a determination is made at 625 as to whether the relationship has previously been captured as represented by the tree. Here it has not been previously captured, so at 627 a determination is made as to whether the relationship with account 6 is found within the primary group—which it is not. At 629 a determination if made as to whether another entity has the relationship with the account 6. Because the relationship is associated with services outside of the primary group, the abnormality score is equal to the distance between service 1 and services 6, 7, or 8, whichever is less (see 630).

FIG. 7 illustrates a matrix for use in classifying new access data as part of generation of detection results illustrated in FIG. 2 according to some embodiments of the invention. Generally, the matrix is used to process an abnormality detection to determine what type of abnormality is identified.

Specifically, abnormality detection matrix 700 provides a structure for determining an abnormality classification based on types and combinations of identified abnormalities. For instance, the first column is used to represent the number of abnormalities (viewed as Boolean values) between the account and host. For instance, if an entry in the column contains a zero then no abnormalities are present and if the entry in the column contains a two then both the account to the host and the host to the account relationships are abnormal (e.g. abnormal when view from the perspective of the account and from the host). Additionally, if the entry in the column contains a one, then either the account to the host or the host to the account relationships, but not both, are abnormal. Similarly, the second column is represented in the same way between the account and the service, and the third column is represented in the same way between the host and the service. Finally, the last column provides an abnormality classification for corresponding rows—e.g. breach, unusual admin console, compromised secure console/jump system, rogue admin, insider attack, admin second console.

Thus, using the anomaly determinations a lookup operation can be performed on the matrix to identify the corresponding classification. Furthermore, in some embodiment one or more rules can be applied to generate alerts based on the type of classification, such as logging, display on a graphical account interface (GUI) using a banner or popup, email, text message, or other instant type message or any combination thereof.

Figure 8:
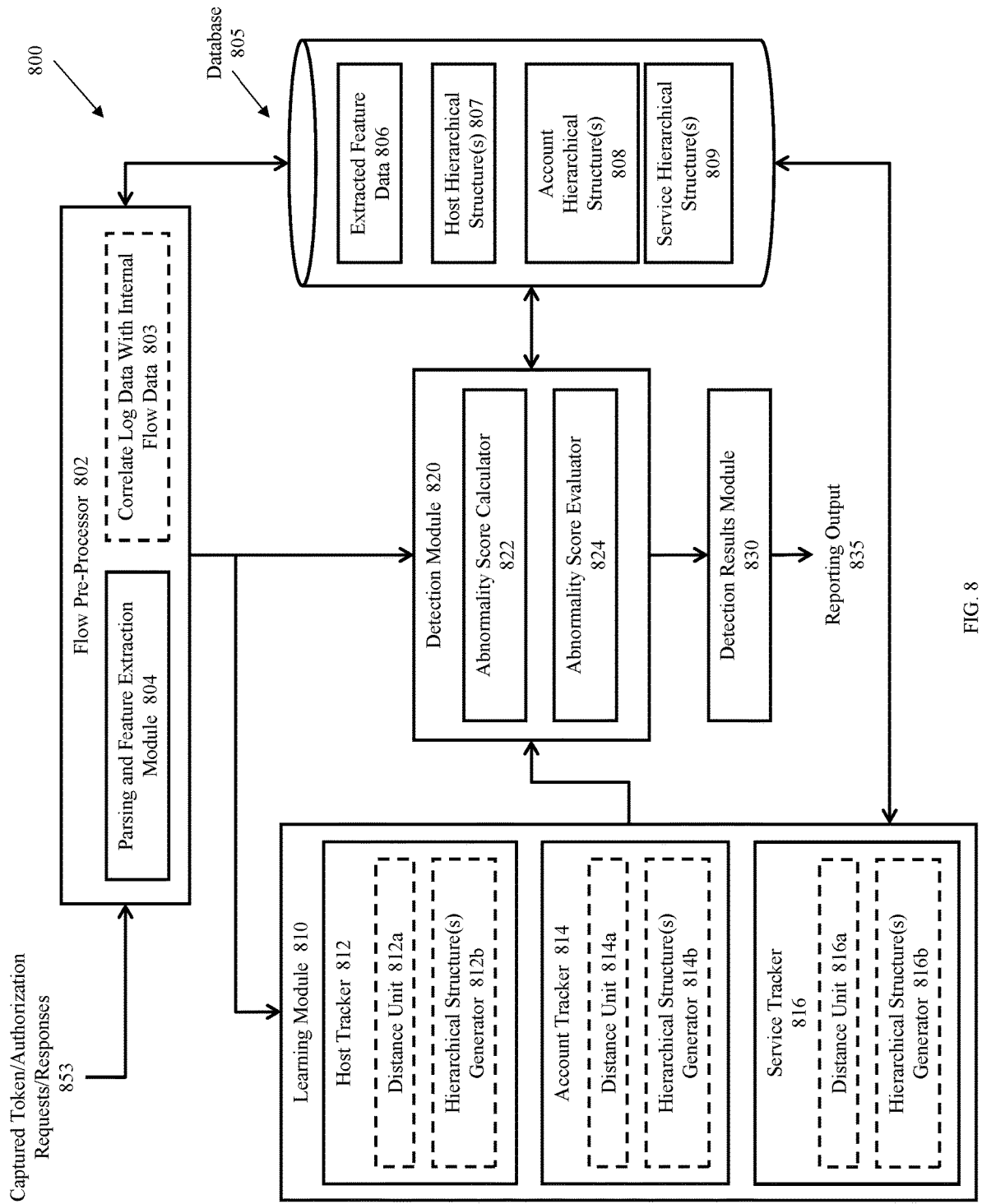
FIG. 8 illustrates a block diagram of at least some embodiments of the invention.

FIG. 8 illustrates a block diagram of at least some embodiments of the invention. For instance, the block diagram illustrates a learning module for generation of the hierarchical structures, a detection module for abnormality score determination and evaluation, a flow pre-processor for ingesting data, and a database for use in storing and/or exchanging data between the elements.

The flow pre-processor 802 receives captured token/authorization requests/responses 833. In some embodiments, the data representing captured token/authorization requests/responses is captured by a sensing module as discussed above, whether part of or separate from detection engine 800. For instance, in some embodiments this comprises packet copy operation data captured in real-time from one or more switches (e.g. switch(es) 106) using one or more taps. In some embodiments, the captured token/authorization requests/responses 833 are processed at the location they are received, such as at the one or more switches (e.g. switch(es) 106) or at one or more hosts where the sensing module or elements of the detection engine are located. Regardless of how the corresponding data is captured, it is parsed using an extraction module 804, and optionally, with log data correlated with the internal flow data 803 to perform feature extraction as discussed above. In some embodiments, the results of the processing are stored in random access memory for local/future processing and/or in a database (e.g. database 805) in a portion for extracted feature data 806. In some embodiments the flow pre-processor 802 is coupled to a learning module 810, a detection module 820, a database 805, or some combination thereof.

The parsing and extraction module 804 identifies one or more packets, and from those packets identifies at least the host (the requesting apparatus), the service being requested, and the account. For instance, the parsing and extraction module utilizes a database of mappings for identifying the above information from the packets sent from or received by the authentication service 122.

In some embodiments, a module for correlating log data with internal flow data 803 is provided. Here, the correlation module receives authentication service log data and processes the log(s) to identify token/authorization request/response data that was not identified via packet capture—e.g. by comparing logged data to a list/database of time stamped token/authorization request/response data stored in random access memory or in a non-volatile storage device (see e.g. extracted authorization data 806 in database 805).

In some embodiments, log data from the authentication service can be correlated with flow data by stitching two sets of data together. For instance, flow data where account information cannot be identified—e.g. encrypted payload data (SSH)—is likely captured in a corresponding log record. This log can be used to associate the encrypted payload/unidentified flow data to a given account and service by correlating known information (timing and/or size of communications) to timing information stored in a corresponding log record.

Generally, Kerberos provides information that can be used to identify the host, account, and service all in one token/authorization response. However, not all methods to authenticate accounts to access services provide this information in one place. In some embodiments, log data from the authentication service or from another location can be correlated with captured network flow data—e.g. when a service acts as an intermediary to an authentication system and obscures the original source of the request (i.e. LDAP and cloud services). For instance, one particular type of authentication service protocol is the lightweight directory access protocol (LDAP) which does not provide all three elements (host, account, service) of information in one place. Instead, when an account connects to a service, the server hosting the service performs the authentication and authorization process to the authentication server (e.g. via LDAP) on behalf of the host from which the account is connecting to the service. Since the server hosting the service performs the authentication on behalf of the account, that server appears to be the client from the point of view of the authentication server's log. Using stitching we can identify corresponding communications from/to a host to a service and from the host hosting the service and an authentication service reached via LDAP by comparing the timing of communications between the host and the service and between the service and the authentication server. Similarly, cloud services generally use a key and resource system but also fail to provide identifying information for a host—e.g. cloud services normally only know an organizations public IP address but not a host's private IP address from inside the organization's network. Yet, a corresponding host for a cloud services access can likewise be identified by comparing the timing and/or size of communications between the host and a gateway device and between the gateway device and the cloud service. Thus, by analyzing the log data, all three elements (host, account, service) involved in the token/authorization request/response data can be identified.

In some embodiments, a learning module 81 includes a host tracker 812, an account tracker 814, and a service tracker 816. In some embodiments, the leaning module 810 accesses the database 805, a portion of random access memory shared with the flow pre-processor 802, or a local storage element (either volatile or non-volatile) to retrieve extracted feature data. The extracted feature data is then used to generate the hierarchical structures as previously discussed in the embodiments above. For instance, each tracker 812, 814, and 816, might include a corresponding distance unit 812a, 814a, and 816a that computes the distances as discussed above in regard to FIG. 3 at 304. Additionally, each tracker 812, 814, and 816, might include a corresponding hierarchical structure(s) generator 812b, 814b, and 816b that generates the tree structures as previously discussed in regard to FIG. 3 at 306, 308, 310, 312, and 314. However, in some embodiments each tracker can generate the corresponding tree structures in parallel using the same extracted feature data (e.g. from 806).

Detection module 820 processes newly captured token/authorization requests/responses from the flow pre-processor 802 as represented by corresponding feature data. For instance, flow pre-processor 802 identifies newly captured token/authorization requests/responses and forwards them to the sensing module or notifies the sensing module of an update to the extracted authorization data (806) in database 805. The detection module 820 includes a score calculator 822 that performs the process corresponding to FIG. 4 at 404, and an abnormality score evaluator 824 that performs the process corresponding to FIG. 4 at 404.

The detection results module 830 processes identified abnormalities as discussed above in regard to FIG. 2 at 210 and FIG. 7. Additionally, the detection results module 830, can generate reports of past activity over a time period, such as the number and type of access requests, including normal and abnormal activity and relevant statistics regarding abnormality classifications such as the number and percent of each classification.

Database 805, as illustrated, comprises a single database. However, database 805 may comprise any of individual disks, storage appliances, distributed storage, or any combination thereof. Furthermore, database 805 may comprise one or more separate storage elements separately or in any combination, storing the extracted feature data 806, the host hierarchical structure(s) 807, the account hierarchical structure(s) 808, the service hierarchical structure(s) 809. Furthermore, the extracted feature data 806, the host hierarchical structure(s) 807, the account hierarchical structure(s) 808, the service hierarchical structure(s) 809 may be stored individually or separately as files, or SQL database entries, or other tabular entries.

In some embodiments, a stability score associated with each hierarchical structure (e.g. tree) is used to generate a confidence value for the detection results. For example, if the detection is of an unusual admin console based on a matched to row 7 in the illustrated structure, then the detection might be associated with a confidence of the corresponding stability scores for each hierarchical structure that was associated with the reporting of an abnormality (e.g. one of the account-host structures, none of the account-service structures, and none of the host-service structures). In some embodiments, a confidence score for the detection might comprise an average of the stability scores, weighted or otherwise.

Therefore, what has been described is an approach for maintaining an ensemble of hierarchical machine learning models and detection of security risks and breaches in a network.

System Architecture Overview

Figure 9:
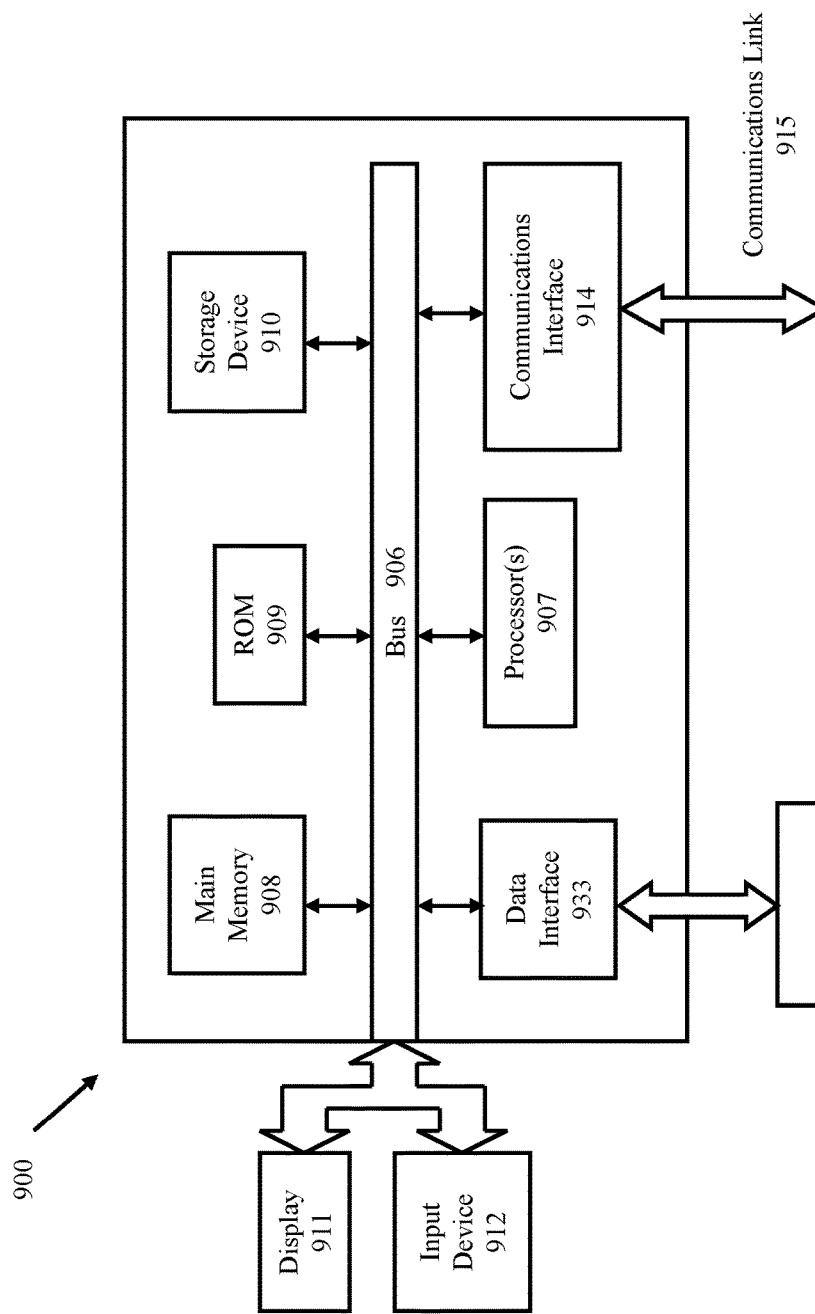
FIG. 9 is a block diagram of an illustrative computing system suitable for implementing an embodiment of the present invention.

FIG. 9 is a block diagram of an illustrative computing system 900 suitable for implementing an embodiment of the present invention. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control.

According to one embodiment of the invention, computer system 900 performs specific operations by processor 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, e.g., application code, through communication link 915 and communication interface 914. Received program code may be executed by processor 907 as it is received, and/or stored in disk drive 910, or other non-volatile storage for later execution. Computer system 900 may communicate through a data interface 933 to a database 932 on an external storage device 931.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for detection of abnormal network authentication activity, comprising:
    generating a plurality of hierarchical structures corresponding to a plurality of entity types, wherein the hierarchical structure represents a relationship between entities of the same type and the entities are associated with one or more attributes;
    identifying access data corresponding to an entity type of the plurality of entity types; and evaluating the access data using a hierarchical structure of the plurality of hierarchical structures.

2. The method of claim 1, wherein the plurality of hierarchical structures are generated using a machine learning process.

3. The method of claim 1, wherein the relationship between entities of the same type comprises a distance metric.

4. The method of claim 1, wherein generating a plurality of hierarchical structures corresponding to a plurality of entity types comprises at least determining a logical distance between entities of the same type based on feature data extracted from collected access data.

5. The method of claim 1, wherein generating the plurality of hierarchical structures corresponding to the plurality of entity types comprises:

generating a first hierarchical structure corresponding to a first entity type, wherein the hierarchical structure represents a first relationship between entities of a first type and the entities of the first type are associated with a first attribute;

generating a second hierarchical structure corresponding to a second entity type, wherein the hierarchical structure represents a second relationship between entities of a second type and the entities of the second type are associated with a second attribute; and generating a third hierarchical structure corresponding to a third entity type, wherein the hierarchical structure represents a third relationship between entities of a third type and the entities of the third type are associated with a third attribute.

6. The method of claim 5, wherein evaluating the access data using the hierarchical structure of the plurality of hierarchical structures comprises generating an abnormality score for the first relationship, the second relationship, and the third relationship.

7. The method of claim 1, further comprising generating a detection result when the access data is determined to be abnormal, the detection result comprising an abnormality classification determined based on a plurality of abnormalities identified by evaluating the access data using a hierarchical structure of the plurality of hierarchical structures.

8. The method of claim 1, wherein access data corresponds to at least requests from hosts to an authentication service or responses from the authentication service to the hosts, requests comprising token or authorization requests, and responses comprising token or authorization responses.

9. The method of claim 1, wherein access data is captured by at least one of:

packet sniffing and authentication service log parsing.

10. The method of claim 1, further comprising generating a confidence score for a detection, wherein the confidence score is based on a stability score, wherein the stability score comprises a metric representing a difference between the plurality of hierarchical structures and previously generated hierarchical structures.

11. The method of claim 1, wherein evaluating the access data using a hierarchical structure of the plurality of hierarchical structures comprising using two or more of the plurality of hierarchical structures to determine whether the access data is abnormal, the hierarchical structures relating individual entity types to a relationship between the individual entity types and a different entity type.

12. A non-transitory computer readable medium having stored thereon a sequence of instructions which, when executed by a processor, performs a set of acts for detection of abnormal network authentication activity, the set of acts comprising:

generating a plurality of hierarchical structures corresponding to a plurality of entity types, wherein the hierarchical structure represents a relationship between entities of the same type and the entities are associated with one or more attributes;

identifying access data corresponding to an entity type of the plurality of entity types; and evaluating the access data using a hierarchical structure of the plurality of hierarchical structures.

13. The computer readable medium of claim 12, wherein the plurality of hierarchical structures are generated using a machine learning process.

14. The computer readable medium of claim 12, wherein the relationship between entities of the same type comprises a distance metric.

15. The computer readable medium of claim 12, wherein generating a plurality of hierarchical structures corresponding to a plurality of entity types comprises at least determining a logical distance between entities of the same type based on feature data extracted from collected access data.

16. The computer readable medium of claim 12, wherein generating the plurality of hierarchical structures corresponding to the plurality of entity types comprises:

generating a first hierarchical structure corresponding to a first entity type, wherein the hierarchical structure represents a first relationship between entities of a first type and the entities of the first type are associated with a first attribute;

generating a second hierarchical structure corresponding to a second entity type, wherein the hierarchical structure represents a second relationship between entities of a second type and the entities of the second type are associated with a second attribute; and generating a third hierarchical structure corresponding to a third entity type, wherein the hierarchical structure represents a third relationship between entities of a third type and the entities of the third type are associated with a third attribute.

17. The computer readable medium of claim 12, the set of acts further comprising generating a detection result when the access data is determined to be abnormal, the detection result comprising an abnormality classification determined based on a plurality of abnormalities identified by evaluating the access data using a hierarchical structure of the plurality of hierarchical structures.

18. The computer readable medium of claim 12, further comprising generating a confidence score for a detection, wherein the confidence score is based on a stability score, wherein the stability score comprises a metric representing a difference between the plurality of hierarchical structures and previously generated hierarchical structures.

19. The computer readable medium of claim 12, wherein evaluating the access data using a hierarchical structure of the plurality of hierarchical structures comprising using two or more of the plurality of hierarchical structures to determine whether the access data is abnormal, the hierarchical structures relating individual entity types to a relationship between the individual entity types and a different entity type.

20. A system for detection of abnormal network authentication activity, comprising:

a memory storing a sequence of program code instructions; and a processor that executes the sequence of program code instructions to perform a set of acts, comprising:
generating a plurality of hierarchical structures corresponding to a plurality of entity types, wherein the hierarchical structure represents a relationship between entities of the same type and the entities are associated with one or more attributes;
identifying access data corresponding to an entity type of the plurality of entity types; and
evaluating the access data using a hierarchical structure of the plurality of hierarchical structures.

21. The system of claim 20, wherein the plurality of hierarchical structures are generated using a machine learning process.

22. The system of claim 20, wherein the plurality of hierarchical structures are generated using a machine learning process.

23. The system of claim 20, wherein the relationship between entities of the same type comprises a distance metric.

24. The system of claim 20, wherein generating a plurality of hierarchical structures corresponding to a plurality of entity types comprises at least determining a logical distance between entities of the same type based on feature data extracted from collected access data.

25. The system of claim 20, wherein generating the plurality of hierarchical structures corresponding to the plurality of entity types comprises:
generating a first hierarchical structure corresponding to a first entity type, wherein the hierarchical structure represents a first relationship between entities of a first type and the entities of the first type are associated with a first attribute;
generating a second hierarchical structure corresponding to a second entity type, wherein the hierarchical structure represents a second relationship between entities of a second type and the entities of the second type are associated with a second attribute; and
generating a third hierarchical structure corresponding to a third entity type, wherein the hierarchical structure represents a third relationship between entities of a third type and the entities of the third type are associated with a third attribute.

26. The system of claim 20, further comprising generating a detection result when the access data is determined to be abnormal, the detection result comprising an abnormality classification determined based on a plurality of abnormalities identified by evaluating the access data using a hierarchical structure of the plurality of hierarchical structures.

* * * * *